United States Patent [19]

Kim

[11] Patent Number: 5,371,601
[45] Date of Patent: Dec. 6, 1994

[54] LUMINANCE SIGNAL UNFOLDING AND REEMPHASIZING CIRCUIT

[75] Inventor: Yong-Je Kim, Suwon, Rep. of Korea

[73] Assignee: SamSung Electronics Co., Ltd., Suwon, Rep. of Korea

[21] Appl. No.: 897,850

[22] Filed: Jun. 12, 1992

[30] Foreign Application Priority Data

Jun. 27, 1991 [KR] Rep. of Korea .................... 91-10838

[51] Int. Cl.$^5$ .................... H04N 5/92; H04N 9/79
[52] U.S. Cl. .................... 358/310; 358/330; 348/427; 348/431
[58] Field of Search .................... 358/39, 31, 138, 310, 358/330, 105, 12; 348/427, 430, 431; H04N 5/92, 9/80, 9/79

[56] References Cited

U.S. PATENT DOCUMENTS

| | | | |
|---|---|---|---|
| 4,621,236 | 11/1986 | Reitmeier et al. | 358/141 |
| 4,772,961 | 9/1988 | Ichinoi | 360/9.1 |
| 4,831,463 | 5/1989 | Faroudja | 358/310 |
| 4,943,848 | 7/1990 | Fukinuki | 358/12 |
| 5,031,030 | 7/1991 | Hurst Jr. | 358/16 |
| 5,063,457 | 11/1991 | Ishikawa et al. | 358/330 |
| 5,113,262 | 5/1992 | Strolle | 358/310 |
| 5,161,030 | 11/1992 | Song | 358/330 |
| 5,220,465 | 6/1993 | Kim et al. | 348/390 |
| 5,274,464 | 12/1993 | Strolle et al. | 358/330 |

OTHER PUBLICATIONS

E. Howson and D. Bell, "Reduction of Television Bandwidth by Frequency-Interlace", Feb. 1960, pp. 127–136.

(disclosed anonymously) "Video Signal Bandwidth Compression" No. 183, Jul. 1979, pp. 382–384.

Primary Examiner—Victor R. Kostak
Assistant Examiner—Chris Grant
Attorney, Agent, or Firm—Robert E. Bushnell

[57] ABSTRACT

A video playback device for playing back a video signal recorded to a recording medium such as a magnetic tape by folding a high frequency signal component onto a low frequency signal component. A luminance signal decoding circuit is made such that since a transition between regions of the luminance signal is controlled by utilizing a motional signal contained within the folded luminance signal. The luminance signal of the folded full band width can be restored so as to be distributed in an original frequency band without any deterioration of picture quality.

24 Claims, 2 Drawing Sheets

LUMINANCE SIGNAL UNFOLDING AND REEMPHASIZING CIRCUIT

BACKGROUND OF THE INVENTION

1. Field of the Invention

The present invention relates to a video playback device for playing back, from a recording medium, a fullband video signal in which a high frequency signal component is folded onto a low frequency signal component and recorded on the recording medium such as a magnetic tape, and more particularly, to a luminance signal decoding circuit for to correctly decoding a luminance signal of full band without any deterioration of picture quality.

2. Description of the Prior Art

A television signal of NTSC or PAL system which is generally used has a frequency band of about 5 MHz, comprises a luminance signal and chrominance signal.

Namely, a typical television signal comprises a luminance signal having a frequency band of about 5 MHz and a chrominance signal having a frequency band of approximately 1 MHz around 3.58 MHz.

However, a normal cassette tape serving as a recording medium has a frequency bandwidth of approximately 3.5 MHz.

Accordingly, existing video recording and playing back devices can only record and playing back luminance signals of 2.5 MHz and chrominance signals of 1 MHz frequency bands.

Thus, in order to solve a disadvantage of the existing video recording and playing back devices which is not capable of recording a luminance signal of full band to a normal cassette tape, a method capable of recording and playing back a television signal of full band to a normal cassette tape was disclosed in the U.S. patent application Ser. No. 07/569029 filed by Sam Sung Electronic Co. Ltd now U.S. Pat. No. 5,223,262.

In accordance with the aforementioned U.S. patent application Ser. No. 07/569029, the high frequency luminance signal component is folded onto the low frequency luminance signal component during recording, and the high frequency luminance signal folded onto the low frequency luminance signal is then unfolded so as to be distributed to an original frequency band during play back.

The video recording and play back device disclosed in the above-described U.S. patent application Ser. No. 07/569029 provided for the recordation of a motional signal representing image motion together with the chrominance signal in order to control transitions between image regions of the luminance signal upon playing back.

However, the video recording and playing back device described in the above-described U.S. patent application Ser. No. 07/569029 will not correctly reproduce the motional signal when a video playback head could not correctly scan a video track of the tape during playing back, and could not correctly control the transition between regions of the luminance signal because to the motional signal contains errors.

Therefore, the video recording and playing back device described in the U.S. patent application Ser. No. 07/569029 has the a problem that the luminance signal in which the high frequency luminance signal is folded onto the low frequency luminance signal can not be correctly restored causing the image deterioration during playing back.

SUMMARY OF THE INVENTION

Therefore, it is an object of the present invention to provide a luminance signal decoding circuit which can restore a full bandwidth luminance signal having a high frequency luminance signal folded onto a low frequency luminance signal so as to be distributed to an original frequency band.

Another object of the present invention is to provide a video signal playback device having high resolution capable of playing back a full bandwidth video signal recorded to a recording medium of limited bandwidth without any deterioration of picture quality.

The luminance signal decoding circuit in accordance with the present invention for accomplishing the above-described objects comprises a modulator for unfolding a high frequency luminance signal folded onto a low frequency luminance signal via a folding carrier so as to be distributed to an original frequency band, a horizontal high band pass filter for extracting a horizontal high band signal from the luminance signal of full band unfolded at the modulator, a motional signal detector for detecting a motional signal from the luminance signal folded with the high frequency luminance signal onto the low frequency luminance signal, an attenuation controller for attenuating the horizontal high band luminance signal extracted by the horizontal high band pass filter in response to the motional signal detected by the motional signal detector, and an adder for summing the luminance signal folded with a high frequency luminance signal to a low frequency luminance signal by a folding carrier and the horizontal high band luminance signal attenuated by the motional signal at the attenuation controller and thereby outputting as a luminance signal distributed to the original frequency band.

DETAILED DESCRIPTION OF THE INVENTION

Figure 1:
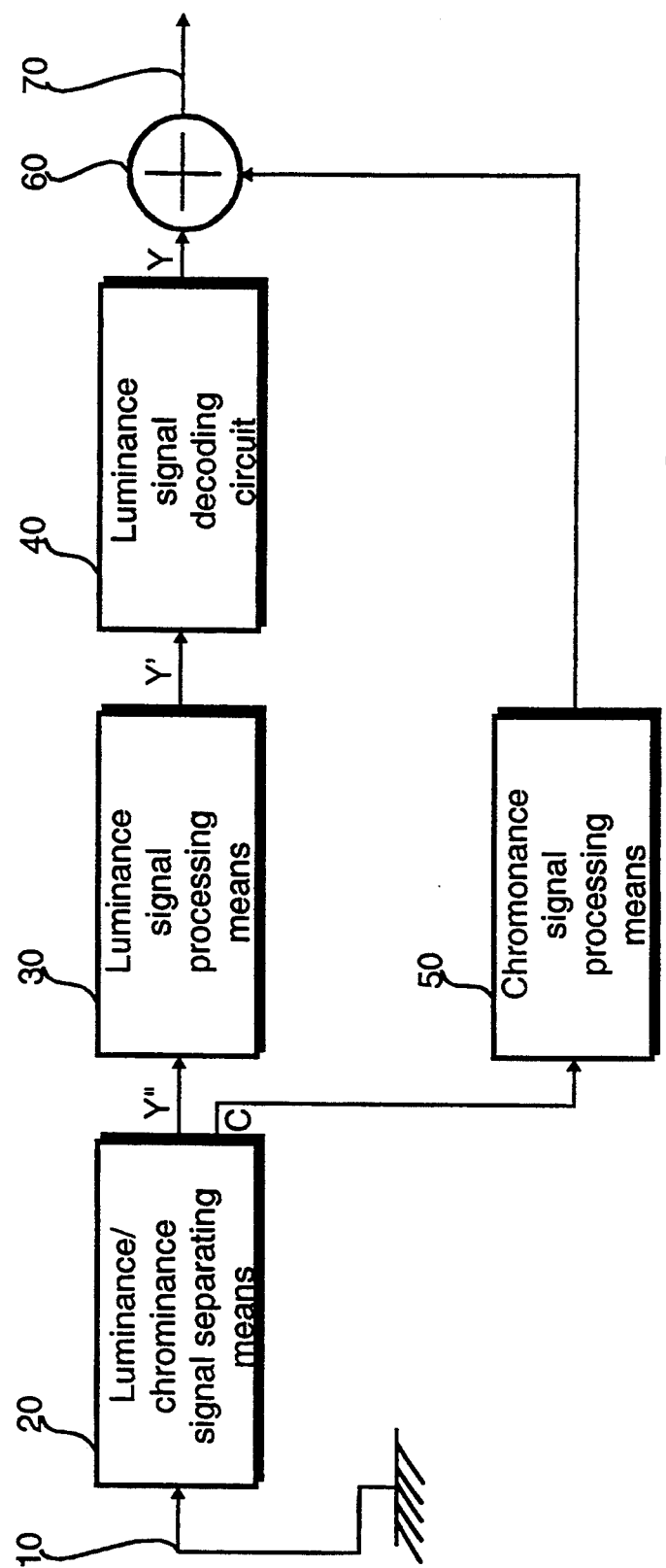
FIG. 1 is a block diagram of a preferred embodiment of a video signal playback device according to the present invention.

FIG. 1 shows a block diagram of a preferred embodiment of a video signal playback device according to the present invention.

In FIG. 1, a head 10 reads out a video signal from a standard cassette tape in which a luminance signal of a high frequency band is folded and recorded onto a luminance signal of a low frequency band and feeds the signal a luminance/chrominance separator 20.

Here, the luminance signal of high frequency band folded and recorded onto the luminance signal of low frequency band is a luminance signal with a frequency band width greater than that of standard cassette tape.

On the other hand, the luminance/chrominance signal separator 20 outputs by separation of the video signal from the head 10, a luminance signal Y" and a chrominance signal C.

Here, the separated luminance signal Y" is luminance signal of full band width having the high frequency luminance signal folded onto the low frequency luminance signal and it is a frequency modulated signal, and the separated chrominance signal C is an amplitude modulated signal.

A luminance signal processor 30 outputs Y' by frequency-demodulating the luminance signal Y" which is a frequency modulated signal outputted from the luminance/chrominance separator 20.

A luminance signal decoding circuit 40 unfolds the high frequency luminance component among the luminance signal Y' so as to be distributed to an original frequency band, and feeds an unfolded luminance signal Y of full band to an adder 60.

On the other hand, a chrominance signal processor 50 amplitude-demodulates a chrominance signal C which is an amplitude modulated signal outputted from the luminance/chrominance signal separator 20 and outputs to the adder 60.

The adder 60 sums the luminance signal of full band width unfolded to the original band width at the luminance signal decoding circuit 40 and the chrominance signal amplitude-modulated at the chrominance signal processor 50 and thereby produces a composite video signal, and outputs the produced composite video signal to other processor of the video signal playback device through a terminal 70.

Here, the other processor of the video signal playback device could be a video displaying device such as a cathode-ray tube, and the video displaying device displays a pictorial image by receiving the composite video signal outputted from the adder 60.

Figure 2:
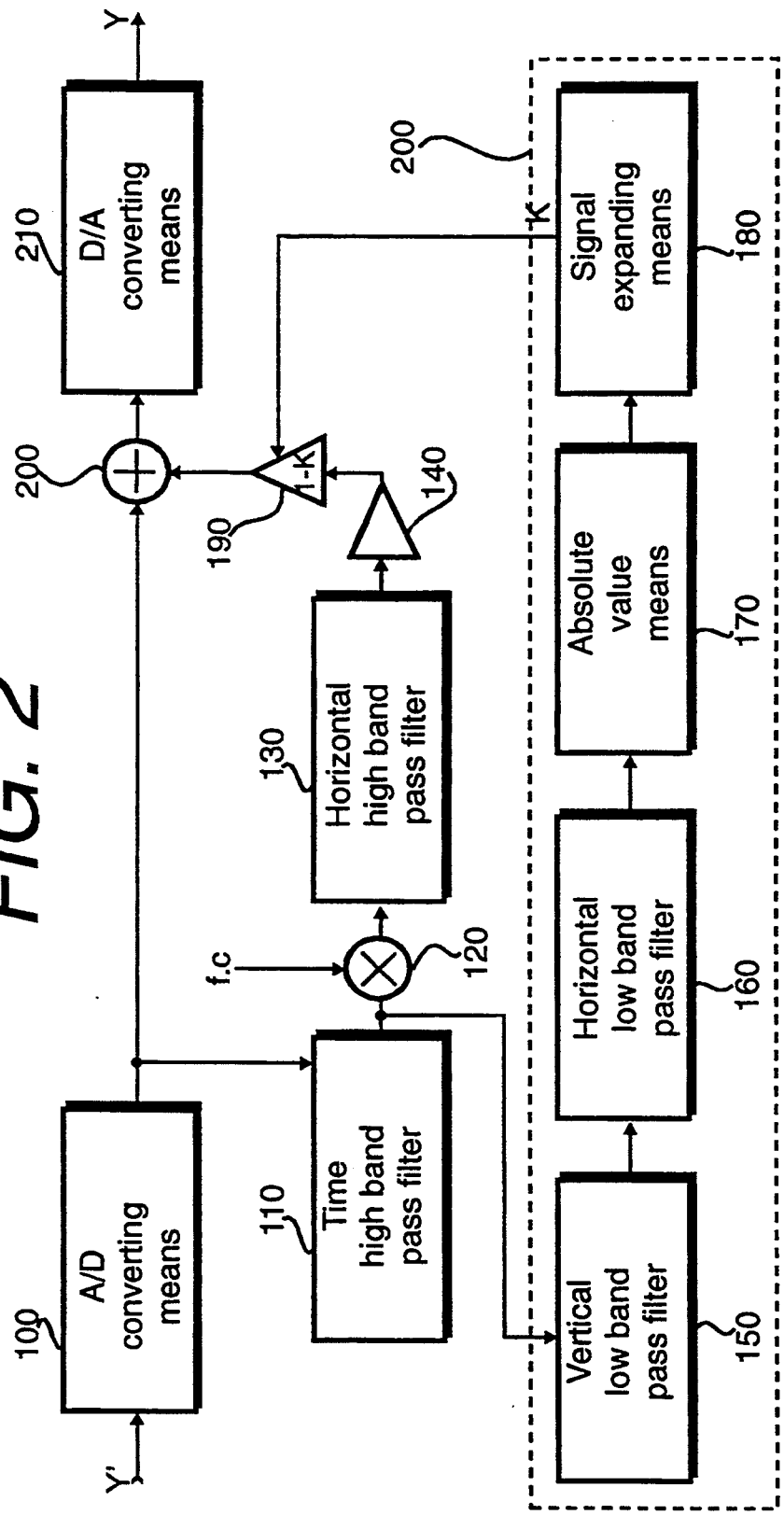
FIG. 2 is a block diagram of a luminance signal decoding circuit shown in FIG. 1.

FIG. 2 shows a block diagram showing a preferred embodiment of the luminance signal decoding circuit 40 in the video signal playback device according to the present invention shown in FIG. 1, in which the luminance signal Y inputted to an A/D (analog to digital) converter 100 is a luminance signal of full band having the high frequency luminance signal folded onto the low frequency luminance signal.

The A/D converter 100, when the luminance signal Y' of full band width folded with the high frequency luminance signal onto the low frequency luminance signal is inputted, quantizes the inputted luminance signal of full band to a predetermined frequency (to an approximately two times of the frequency band width of the video signal), and outputs the quantized signal by coding.

That is, the folded luminance signal Y' of full band width is outputted by converting to a digital luminance signal.

A time high band pass filter 110 filters the digital luminance signal outputted from the A/D converter 100 via a time high band filtering, and separates the motional signal distributed to the horizontal low frequency band and the horizontal high frequency luminance signal folded to the horizontal low frequency band by a folding carrier.

A modulator 120 samples the horizontal high frequency luminance signal folded onto the horizontal low frequency band outputted from the time high band pass filter 110 by an unfolding carrier f.c. and thereby unfolds to the original frequency band.

A horizontal high band pass filter 130 filters the luminance signal unfolded to the original frequency band at the modulator 120 and thereby detects a luminance signal of the horizontal high frequency band.

The luminance signal of the horizontal high frequency band detected at the horizontal high band pass filter 130 is fed to a reemphasizor 140.

The reemphasizor 140 outputs the luminance signal of the horizontal high frequency band fed from the horizontal high band pass filter 130 by reemphasizing to a level before the recording.

Here, the reason for reemphasizing the luminance signal of the horizontal high frequency band is, because it is deemphasized to not interfere with to the low band upon recording by folding, for restoring this to an original state.

On the other hand, a motional signal detecting means 220 comprises a vertical low band pass filter 150, a horizontal low band pass filter 160, absolute value detector 170, and signal expander 180. Specifically, a vertical low band pass filter 150 filters the horizontal high frequency luminance signal folded onto the horizontal low frequency band outputted from the time high band pass filter 110 by vertical low band filtering.

A horizontal low band pass filter 160 filters an output of the vertical low band pass filter 150 by the horizontal low band filtering and thereby eliminates a signal contained on a horizontal axis in the output of the horizontal low band pass filter 150.

At this moment, the output of the horizontal low band pass filter 160 contains only the motional signal which varies in response to the time.

An absolute value detector 170 seeks and obtains an absolute value of the motional signal outputted from the horizontal low band pass filter 160 and thereafter outputs to a signal expander 180.

The signal expander 180 expands the absolute value of the motional signal outputted from the absolute value detector 170 on the horizontal, vertical and time axes and thereby mitigates the rapid change of the motional signal and outputs a coefficient K in accordance with the mitigated motional signal.

The coefficient K outputted from the signal expander 180 is applied to a control terminal of a attenuation controller 190 such as a soft switch.

The attenuation controller 190 attenuates a magnitude of the luminance signal of the horizontal high frequency band from the reemphasizor 140 in response to the magnitude of the coefficient K outputted from the signal expander 180 and thereafter feeds to an adder 200.

That is, the signal expander 180 outputs the coefficient near "1" in case when the magnitude of the motional signal is big and outputs the coefficient near "0" in case when the magnitude of the motional signal is small, and the attenuation controller 190 does not output the luminance signal to be inputted when the coefficient K is near "1" because the luminance signal is attenuated by the coefficient K of "1" and outputs the luminance signal unchanged when the coefficient is near "0" because the luminance signal is not attenuated by the coefficient K of "0".

On the other hand, the adder 200 sums the luminance signal from the A/D converter 100 and the luminance signal of the horizontal frequency band from the attenuation controller 190 and thereby produces the luminance signal of full band width in which the horizontal high frequency signal is appropriately unfolded in accordance with the motional signal.

That is, when the luminance signal Y' having a motional signal and being not folded is inputted, and the output of the attenuation controller 190 is almost "0" because the luminance signal is attenuated by "1", the adder 200 outputs the luminance signal outputted from the A/D converter 100. Alternatively, when the luminance signal Y' having no motional signal and being folded is inputted, the attenuation controller 190 outputs by summing the unfolded luminance signal outputted from the reemphasizor 140 and the luminance signal outputted from the A/D converter 100.

Accordingly, the adder 200 outputs the original full band luminance signal which is not folded.

A D/A convertor 210 outputs Y by converting the original full band digital luminance signal from the adder 200 into an analog signal.

The full band luminance signal Y converted into the analog signal at the D/A converter 210 is inputted to a luminance/chrominance combiner means such as the adder 60 shown in FIG. 1 and thereby being outputted by summing with the chrominance signal outputted from the chrominance signal processor.

As described at above, according to the present invention, since the transition between regions of the luminance signal is controlled by utilizing the motional signal contained within the luminance signal of the folded full band width when the luminance signal of the high frequency band unfolds the luminance signal of full band width folded to the low frequency band by the folding carrier, there is effect that the luminance signal of the folded full band width can be restored so as to be distributed to the original frequency band without any deterioration of image quality.

Although it is described with regard to a preferred embodiment of the present invention, it is obvious that various variations and modifications can be executed without departing from the scope of the present invention.

Particularly, although the vertical and horizontal low band pass filters as well as the absolute value detector and the signal expander are employed for obtaining the coefficient K in response to the motional signal in the above description, this can be substituted by a motional signal detector.

What is claimed is:

1. A luminance signal decoding circuit, comprising:
   modulating means for unfolding a folded luminance signal having a high frequency luminance signal component folded onto a low frequency luminance signal component in response to a predetermined carrier to generate an unfolded luminance signal;
   horizontal high band pass filter means for extracting a horizontal high band luminance signal from said unfolded luminance signal provided by said modulating means;
   motion signal detecting means for detecting a motion signal from said folded luminance signal;
   attenuation controlling means for providing an output signal by attenuating said horizontal high band luminance signal extracted by said horizontal high band pass filter means in accordance with said motion signal detected by said motion signal detecting means; and
   summing means for summing said folded luminance signal and said output signal provided by said attenuation controlling means to generate an output luminance signal distributed in an original frequency band.

2. A luminance signal decoding circuit as claimed in claim 1, further comprised of said modulating means distributing a time high band signal detected by converting to a digital signal from an analog signal and filtering at a time high band pass filter, to said original frequency band via said predetermined carrier.

3. A luminance signal decoding circuit as defined in claim 2, wherein said time high band pass filter separates the folded said high frequency luminance signal component from said folded luminance signal including said low frequency luminance signal component which varies with time.

4. A luminance signal decoding circuit as claimed in claim 1, wherein said motion signal detecting means comprises:
   vertical low band pass filter means for detecting a vertical low band luminance signal from said folded luminance signal;
   horizontal low band pass filter means for detecting a horizontal low band luminance signal from said vertical low band luminance signal, said horizontal low band luminance signal comprising only a component of said motion signal varying as a function of time; and
   signal expanding means for expanding said horizontal low blind luminance signal and providing a coefficient in accordance with the expanded signal.

5. A luminance signal decoding circuit as claimed in claim 1, further comprised of said folded luminance signal being a digital signal, and digital-to-analog converter means for converting said output luminance signal into an analog signal.

6. A luminance signal decoding circuit as claimed in claim 1, further comprised of said attenuation controlling means attenuating a magnitude of said horizontal high band luminance signal in accordance with said motion signal.

7. A process for decoding received video signals, said process comprising the steps of:
   detecting motion signals contained in said received video signals, said motion signals being indicative of image motion in said received video signals;
   unfolding folded luminance signals contained in said received video signals to generate high frequency component luminance signals, said folded luminance signals having said high frequency component luminance signals frequency folded onto low frequency component luminance signals; and
   combining said high frequency component luminance signals to said received video signals, said high frequency component luminance signals having relative magnitudes determined in response to said motion signals, said combining step comprising the steps of attenuating said high frequency component luminance signals by an amount determined by said motion signals to generate attenuated high frequency component luminance signals and adding said attenuated high frequency component luminance signals to said received video signals.

8. A process as claimed in claim 7, wherein said motion signals are detected by the steps of:
   detecting vertical low band luminance signals from said folded luminance signals;
   detecting horizontal low band luminance signals from said vertical low band luminance signals; and
   expanding said horizontal low band luminance signals to provide expanded signals and computing a motion coefficient of said motion signals in accordance with said expanded signals.

9. A luminance signal decoding circuit, comprising:
   means for unfolding folded luminance signals contained in received video signals to generate unfolded luminance signals;

means for horizontally high band pass filtering said unfolded luminance signals and providing high frequency luminance signal components;

means for isolating and providing motion signals contained in said received video signals, said motion signals being representative of image motion in said received video signals; and means for combining said received video signals with said high frequency luminance signal components, said high frequency luminance signal components having relative magnitudes determined in response to said motion signals.

10. A luminance signal decoding circuit as claimed in claim 9, further comprised of said received video signals being digital signals and digital-to-analog converter means for converting an output of said combining means into analog signals.

11. A luminance signal decoding circuit as claimed in claim 9, wherein said motion signals isolating and providing means comprises:

vertical and horizontal low band pass filter means for detecting vertical and horizontal low band luminance signal components of said folded luminance signals; and signal expanding means for expanding said vertical and horizontal low band luminance signal components to generate coefficients of said motion signals for controlling the magnitudes of said high frequency luminance signal components.

12. A luminance signal decoding circuit as claimed in claim 11, further comprising means for attenuating said high frequency luminance signal components in response to said coefficients before said combining means combines said high frequency luminance signal components with said received video signals.

13. A luminance signal decoding circuit, comprising:

means for generating temporally high pass filtered signals by temporally high pass filtering received video signals;

modulating means for generating unfolded luminance signals by multiplying said temporally high pass filtered signals with a predetermined carrier;

means for horizontal high band pass filtering said unfolded luminance signals to isolate high frequency luminance signal components;

vertical and horizontal low band pass filter means for detecting vertical and horizontal low band luminance signal components of said temporally high pass filtered signals;

signal expanding means for expanding said vertical and horizontal low band luminance signal components to generate coefficients; and means for attenuating said high frequency luminance signal components in response to said coefficients and combining the attenuated said high frequency luminance signal components with said received video signals.

14. A luminance signal decoding circuit, comprising:

modulating means for unfolding a folded luminance signal having a high frequency luminance signal component folded onto a low frequency luminance signal component via a predetermined carrier to generate an unfolded luminance signal;

horizontal high band pass filter means for extracting a horizontal high band luminance signal from said unfolded luminance signal from said modulating means;

motion signal detecting means for detecting a motion signal from said folded luminance signal;

attenuation controlling means for providing an output signal by attenuating said horizontal high band luminance signal extracted by said horizontal high band pass filter means in accordance with said motion signal detected by said motion signal detecting means; and summing means for summing said folded luminance signal and said output signal provided from said attenuation controlling means to generate an output luminance signal distributed in an original frequency band.

15. A luminance signal decoding circuit as claimed in claim 14, further comprised of said folded luminance signal being a digital signal, and time high band pass filter means for separating said motion signal distributed in a horizontal low frequency band of said folded luminance signal by temporally high band pass filtering said folded luminance signal.

16. A luminance signal decoding circuit as claimed in claim 15, further comprised of reemphasis means for emphasizing a magnitude of said horizontal high band luminance signal to a predetermined level before said horizontal high band luminance signal is attenuated by said attenuation controlling means in accordance with said motion signal.

17. A luminance signal decoding circuit as claimed in claim 14, wherein said motion signal detecting means comprises:

vertical low band pass filter means for detecting a vertical low band luminance signal from said folded luminance signal;

horizontal low band pass filter means for detecting a horizontal low band luminance signal from said vertical low band luminance signal; and signal expanding means for expanding said horizontal low band luminance signal and computing a coefficient in accordance with the expanded signal.

18. A luminance signal decoding circuit as claimed in claim 17, wherein said horizontal low band signal detected through said vertical low band pass filter means and said horizontal low band pass filter means includes said motion signal, said motion signal varying with time.

19. A luminance signal decoding circuit as claimed in claim 14, further comprising said attenuation controlling means attenuating a magnitude of said horizontal high band luminance signal for emphasizing a magnitude of said horizontal high band luminance signal to a level before recording in accordance with said motion signal.

20. A process as claimed in claim 7, wherein said step of detecting said motion signals comprises:

generating temporally high pass filtered video signals by temporally high pass filtering said received video signals;

generating low pass filtered video signals by vertically and horizontally low pass filtering said temporally high pass filtered video signals; and generating motion coefficients of said motion signals by expanding said low pass filtered video signals for controlling the magnitudes of said high frequency component luminance signals.

21. A process as claimed in claim 7, wherein unfolding said folded luminance signals comprises:

generating temporally high pass filtered video signals by temporally high pass filtering said received video signals; and generating said high frequency component luminance signals by multiplying said temporally high pass filtered video signals by a predetermined carrier.

22. A process as claimed in claim 20, wherein said unfolding folded luminance signals comprises:

generating said high frequency component luminance signals by temporally high pass filtering said received video signals and then multiplying the temporally high pass filtered video signals by a predetermined carrier.

23. A process as claimed in claim 8, wherein said unfolding folded luminance signals comprises:

generating temporally high pass filtered video signals by temporally high pass filtering said received video signals; and generating said high frequency component luminance signals by multiplying said temporally high pass filtered video signals by a predetermined carrier.

24. A process as claimed in claim 23, wherein the step of detecting said motion signals comprises:

generating temporally high pass filtered video signals by temporally high pass filtering said received video signals; and generating low pass filtered video signals by vertically and horizontally low pas filtering said temporally high pass filtered video signals.

* * * * *

UNITED STATES PATENT AND TRADEMARK OFFICE
CERTIFICATE OF CORRECTION

PATENT NO. : 5,371,601
DATED : 6 December 1994
INVENTOR(S) : Yong-Je Kim

It is certified that error appears in the above-indentified patent and that said Letters Patent is hereby corrected as shown below:

Column 1 Line 10, before "video" change "fullband" to --full band--;

Column 1 Line 14, before "correctly" delete "to";

Column 1 Line 62, after "because" delete "to";

Column 1 Line 66, before "problem" delete "a";

Column 2 Line 60, before "standard" insert --the--;

Column 3 Line 24 & 26, after "other" change "processor" to --processors--;

Column 5 Line 13, after "combiner" delete "means":

Signed and Sealed this

Twenty-ninth Day of April, 1997

Attest:

BRUCE LEHMAN

Attesting Officer

Commissioner of Patents and Trademarks